United States Patent [19]

Thompson et al.

[11] 4,166,878

[45] Sep. 4, 1979

[54] GAS TURBINE ENGINE INTERNAL INSULATION COMPRISING METALLIC MESH—RESTRAINED CERAMIC FIBER LAYER

[75] Inventors: LeRoy R. Thompson; Edward G. Meints, both of Peoria, Ill.

[73] Assignee: Caterpillar Tractor Co., Peoria, Ill.

[21] Appl. No.: 882,840

[22] Filed: Mar. 2, 1978

Related U.S. Application Data

[62] Division of Ser. No. 728,656, Oct. 1, 1976, Pat. No. 4,083,180.

[51] Int. Cl.$^2$ .................. B32B 3/24; B32B 5/02; B65D 25/16; B65D 25/18
[52] U.S. Cl. .................. 428/256; 220/408; 428/68
[58] Field of Search .................. 428/920, 68, 256

[56] References Cited

U.S. PATENT DOCUMENTS

| 2,514,170 | 7/1950 | Walter et al. | 428/920 |
| 2,720,909 | 10/1955 | Ehrlich | 428/236 |
| 3,819,468 | 6/1974 | Sauder et al. | 428/920 |
| 4,083,180 | 4/1978 | Thompson et al. | 60/39.31 |

Primary Examiner—J. C. Cannon
Attorney, Agent, or Firm—Phillips, Moore, Weissenberger, Lempio & Majestic

[57] ABSTRACT

The invention is concerned with an improved individually replaceable insulation pack comprising a high temperature resistant thin flexible metallic sheet having a porous insulation blanket formed of interlaced ceramic fibers held against a side thereof and including a fine mesh of wire covering the surface of the blanket which is not adjacent to the sheet and holding the blanket against the sheet. The blanket does not contain a binder and is not bonded to the sheet.

3 Claims, 3 Drawing Figures

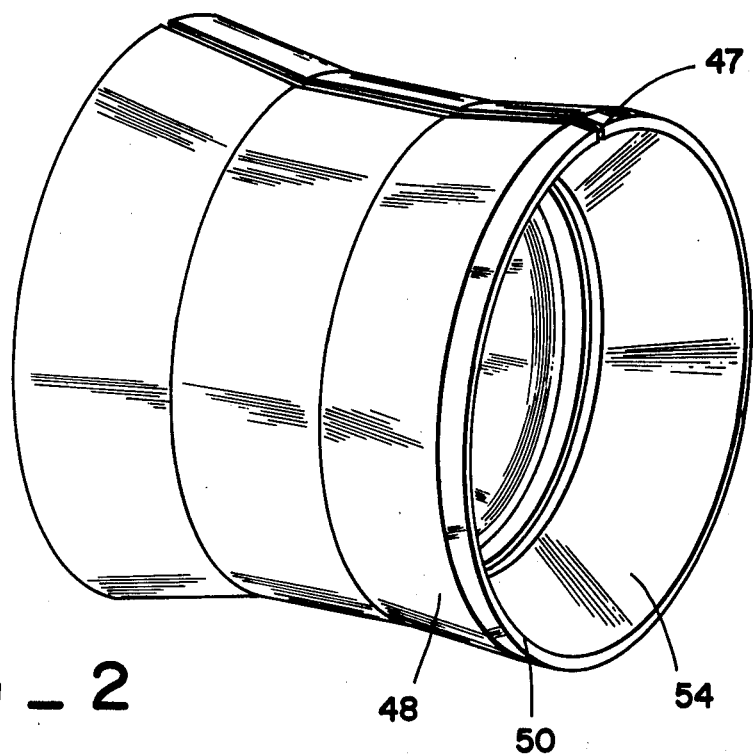
FIG _ 2
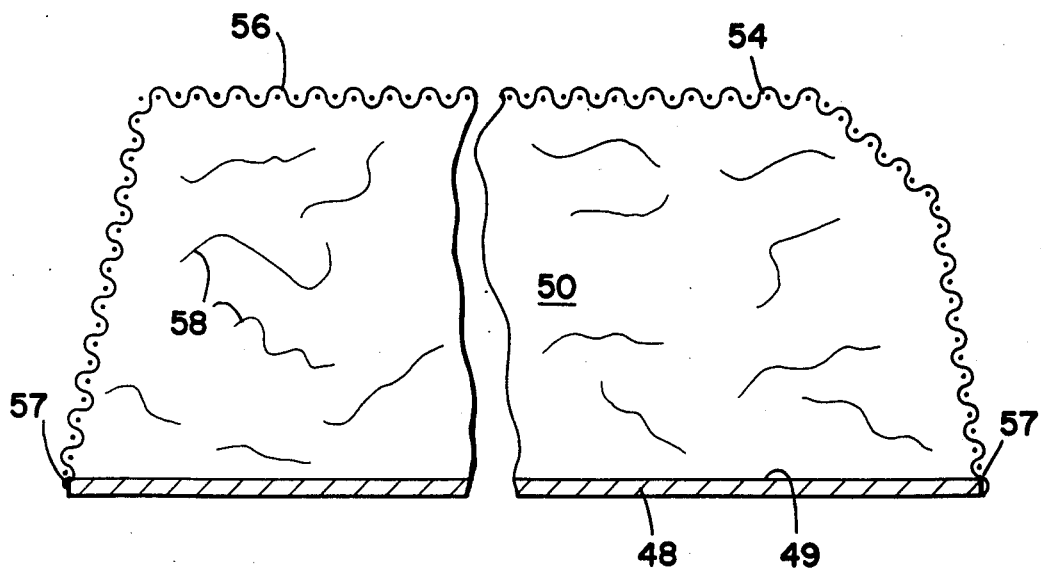
FIG _ 3

3
GAS TURBINE ENGINE INTERNAL INSULATION COMPRISING METALLIC MESH—RESTRAINED CERAMIC FIBER LAYER

This is a division, of Ser. No. 728,656, filed Oct. 1, 1976, now U.S. Pat. No. 4,083,180.

BACKGROUND OF THE INVENTION

1. Field of the Invention

The invention is concerned with insulation and more particularly with an improved insulation pack. Even more particularly the invention is concerned with the use of a plurality of individually replaceable insulation packs for providing heat insulation between a combustion section of a modular gas turbine engine assembly and the case, the gasifier module and the power output module of such an assembly.

2. Prior Art

The prior art, for example U.S. Pat. Nos. 3,310,940; 3,304,054; 3,321,179; and 3,775,979, discloses the use of insulation within gas turbine engines. While insulation per se for use within a gas turbine engine is well known, the prior art has failed to teach the use of a plurality of individually replaceable insulation packs to provide heat insulation between a combustion-ducting section of such an engine and each of the case, the gasifier module and the power output module thereof. Thus, it has been generally customary to make the case of such an engine out of a high temperature resistant material such as a high nickel content alloyed steel. Also, the prior art has failed to teach the provision of such packs which are easily individually removable for replacement. The present invention provides an improvement which is particularly useful in a modular gas turbine engine assembly and wherein a plurality of individually replaceable insulation packs are provided which allow the use of plain carbon steel rather than a high temperature nickel based alloyed steel for the case of the engine.

SUMMARY OF THE INVENTION

The invention comprises an individually replaceable insulation pack comprising a high temperature resistant relatively flexible thin metallic sheet having a porous insulation blanket held against a first side thereof formed of interlaced ceramic fiber with a fine mesh of metal attached to the sheet and covering the surface of the blanket which is not abutted to the sheet. The blanket is not bonded to the sheet and a binder is not used in the blanket to bind the fibers to one another. Generally, the metallic sheet is bendable so that such insulation packs are sufficiently deformable to be individually replaceable within a gas turbine engine assembly.

BRIEF DESCRIPTION OF THE DRAWINGS

The invention will be better understood by reference to the Figures of the drawings wherein like numbers denote like parts throughout and wherein:

FIG. 2 illustrates in perspective an insulation pack in accordance with the present invention and as used in the engine assembly illustrated in FIG. 1; and FIG. 3 illustrates, in section, another insulation pack in accordance with the present invention.

DETAILED DESCRIPTION OF THE PREFERRED EMBODIMENT

Figure 1:
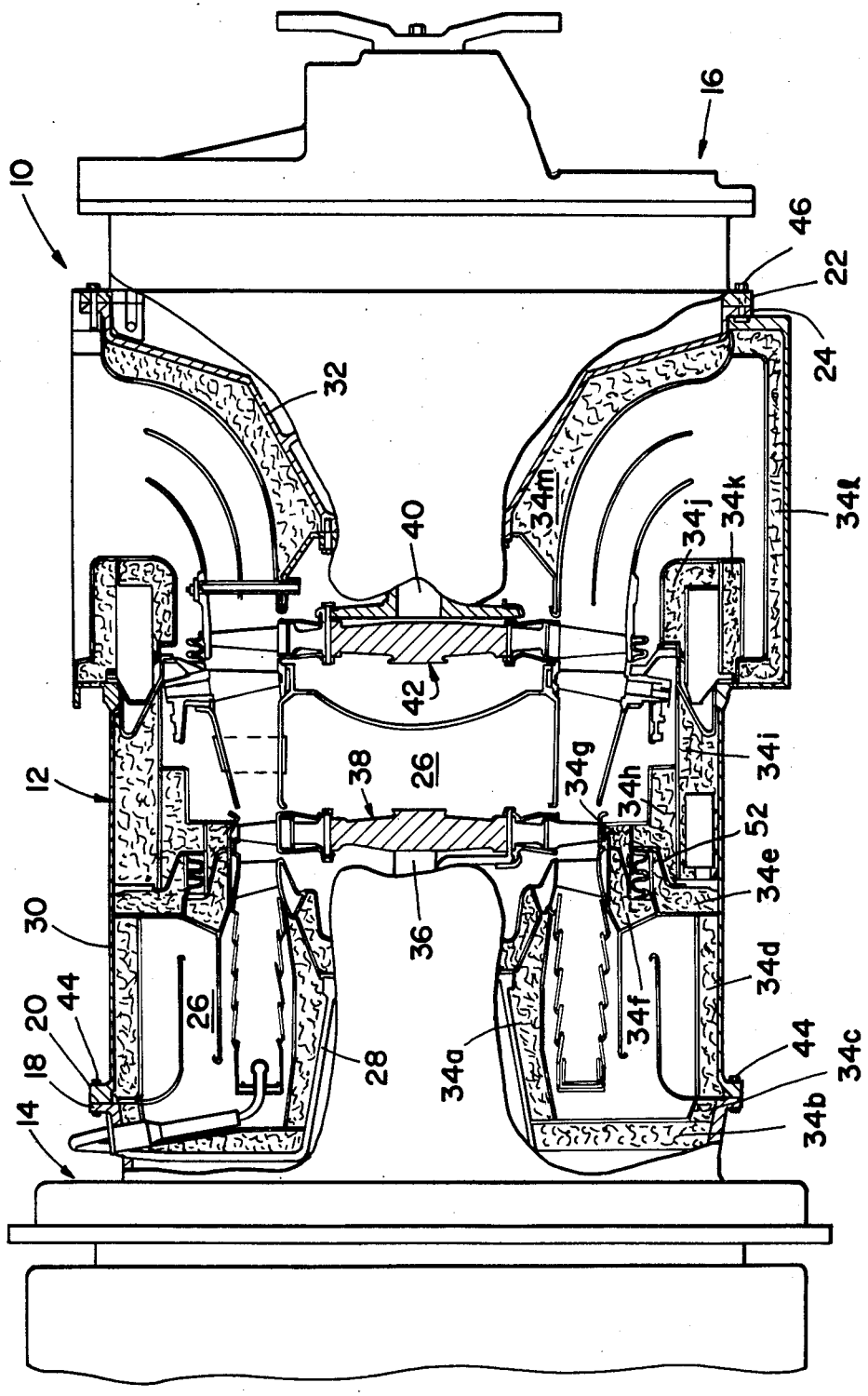
FIG. 1 illustrates in side section a modular gas turbine engine assembly which includes the improvement of the present invention.

Referring first to FIG. 1 there is illustrated therein a modular gas turbine engine 10 which includes the improvement of the present invention. Such an engine is described in considerably more detail in U.S. Patent Application Ser. No. 630,476 filed Nov. 10, 1975 and commonly assigned herewith, and now U.S. Pat. No. 4,030,288. The disclosure of said application Ser. No. 630,476 with respect to the structure and operation of such an engine is hereby referred to and incorporated herein by reference thereto. Briefly, the engine 10 includes a tubular case 12 a gasifier module 14 and a power output module 16. A first end 18 of the gasifier module 14 is detachably attached to a first end 20 of the tubular case 12. A first end 22 of the power output module 16 is detachably attached to a second end 24 of the tubular case 12. The case 12, the gasifier module 14 and the power output module 16 together define a partially walled off combustion-ducting section 26 with the walls thereof comprising a first inwardly extending flange 28, an exterior wall 30 fo the case 12, and a second inwardly extending flange 32 with the first inwardly extending flange 28 extending from the gasifier module 14 and the second inwardly extending flange 32 extending from the power output module 16.

The present invention is particularly concerned with an improvement which comprises a plurality of individually replaceable insulation packs 34 which fit together to provide heat insulation between the combustion-ducting section 26 and each of the tubular case 12, the gasifier module 14 and the power output module 16. It is of course understood that the partially walled off combustion-ducting section 26 is not completely walled off from either the gasifier module 14 or the power output module 16 since a gasifier module shaft 36 and a gasifier turbine 38 must pass from the gasifier module 14 into the walled combustion-ducting section 26 and in like manner a power output shaft 40 and a power turbine 42 must pass from the power output module 16 into the walled combustion-ducting section 26 and, of course, provision must be made for gas flow into and out of the combustion-ducting section 26.

As will be noted by reference to FIG. 1 first bolt means 44 serve to fasten the tubular case 12 to the gasifier module 14 while second bolt means 46 serve to fasten the power output module 16 to the tubular case 12. Thus, and as is explained in considerably more detail in the previously mentioned application Ser. No. 630,476, it is clear that the gasifier module 14 can be removed from the tubular case 12 and likewise the power output module 16 can be removed therefrom simply by removing respective of the bolt means 44 and/or 46.

With the tubular case 12, the gasifier module 14 and the power output module 16 separated from one another, each of the insulation packs 34 can be easily removed and replaced as required. The pack 34a for example can be in the form of a sleeve which is slit longitudinally at a slit 47. To remove the pack 34a all that is necessary is to grasp the sleeve adjacent the longitudinal slitting thereof and to pull it out from around the first inwardly extending flange 28. Generally the pack 34a will be formulated so as to springably grasp the flange 28 when it is in position thereabout. The insulation pack 34c can be in the form of a complete ring and can be simply removed by lifting it out rightwardly from the gasifier module 14 once it has been separated from the tubular case 12. The insulation pack 34b, after removal of the insulation packs 34a and 34c, can be removed by simply lifting it rightwardly away from the gasifier module 14. The insulation pack 34d can be removed similarly to the insulation pack 34c or similarly to the insulation pack 34a if it is slit as is the insulation pack 34a. The insulation pack 34e and the insulation pack 34f can also be removed similarly to the insulation pack 34c. The insulation packs 34g and 34h can be removed from the tubular case 12 once the power module 16 has been removed therefrom. The insulation pack 34i would generally be similarly slit and removed in a similar manner to the insulation pack 34a. The insulation packs 34j and 34k are generally removed similarly to the insulation pack 34c. The insulation pack 34l would generally be removed similarly to the insulation pack 34a. Insulation pack 34m would be removed leftwardly from the power output module 16 after it had been disconnected from the tubular case 12. Insulation pack 34m like insulation pack 34a would preferably include a slit therein to allow it to be more easily removed.

Turning now most particularly to FIGS. 2 and 3 there is illustrated therein most thoroughly the structure of the insulation packs 34. Briefly, each of the insulation packs 34 comprises a high temperature resistant metallic sheet 48 having held against a first side 49 thereof a porous insulation blanket 50. It is useful that the insulation blanket 50 be porous since this assures that the insulation blankets are in no way used as a pressure vessel and that hence the high temperature resistant metallic sheet 48 can be made relatively flexible and thin and does not have to provide sufficient strength to hold pressure. Further, in such structures as pack 34a it is desirable to formulate sheet 48 of spring metal whereby the blanket 50 will be biased thereby to grasp the flange 28. The porous insulation blanket 50 is abutted as illustrated in FIG. 1 against a wall portion, e.g., the first inwardly extending flange 28, the exterior wall 30 of the tubular case 12, the second inwardly extending flange 32 or an inwardly extending structural member 52 all of which together comprise the wall portions of the partially walled off combustion section 26 and the metallic sheet 48 is thereby spaced from the appropriate wall portion of the partially walled off combustion-ducting section 26 by the thickness of the porous insulation blanket 50. Each of the insulation packs 34 generally includes a fine mesh or screen 54 of metal which covers a surface 56 of the insulation blanket 50 which is not abutting the sheet 48. Each of the screens 54 is attached to the respective sheet 48 at the joinder 57 as by welding, riveting, screwing or the like. The insulation blanket 50 preferably comprises interlaced ceramic fibers 58 and a binder is generally not used in the blanket to bind the fibers to one another so that the blanket 50 will remain sufficiently porous. Also, no bonding agent is generally used to bond the blanket 50 to the sheet 48 thus eliminating any problem of bonding agent deterioration and providing added flexibility. It is preferred that the fibers comprise an aluminosilicate fire clay. When insulation packs 34 are utilized as in the improvement of the present invention it has been found that the tubular case 12 along with the first flange 28 and the second flange 32 can be formulated of relatively inexpensive carbon steel rather than of a more expensive high nickel content steel alloy.

It will be noted that each of the insulation packs 34 is generally sized to be held in position against adjacent of the insulation packs 34. Thus, each pack can be made of a size and shape which makes it easily removable and replaceable. Further, it is not necessary to remove or replace the entire insulation within an engine 10 when a portion of the insulation material may have become damaged in one manner or another. Still further, the individual insulation packs 34 are easily removable when necessary for servicing of other internal engine components or parts. With all of the insulation within the engine, the engine can be steam cleaned whenever necessary. Further still, the insulation packs 34 will hold unburned fuel because of their porous nature until it either drains out of fuel drains which can be provided for this purpose or vaporizes or burns out of the insulation packs 34.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

We claim:

1. An improved replaceable insulation pack comprising a high temperature resistant relatively flexible and thin metallic sheet having held against a first side thereof, a porous insulation blanket formed of interlaced ceramic fibers with a fine mesh of metal attached to said sheet and covering the surface of said blanket which is not abutted to said sheet, said mesh serving to hold said blanket against said sheet, said blanket not being bonded to said sheet by a bonding agent and a binder not being used in said blanket to bind said fibers to one another.

2. An improved pack as in claim 1, wherein said fibers comprise an aluminosilicate fire clay.

3. An improved pack as in claim 1, wherein said sheet is formed of a spring metal.

* * * * *